(12) United States Patent
Buer

(10) Patent No.: US 8,225,087 B2
(45) Date of Patent: *Jul. 17, 2012

(54) SYSTEM AND METHOD FOR CONTROL OF SECURITY CONFIGURATIONS

(75) Inventor: Mark L. Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/275,551

(22) Filed: Nov. 21, 2008

(65) Prior Publication Data

US 2009/0106555 A1    Apr. 23, 2009

Related U.S. Application Data

(63) Continuation of application No. 10/207,332, filed on Jul. 29, 2002, now Pat. No. 7,469,338.

(51) Int. Cl.
*H04L 29/06*   (2006.01)
(52) U.S. Cl. ........ 713/155; 713/171; 713/169; 713/176; 713/166; 713/100; 380/37; 380/45; 705/50
(58) Field of Classification Search ............... 726/1–6, 726/17–19; 713/155, 166, 156, 168, 173, 713/176, 182, 189; 705/67
See application file for complete search history.

(56) References Cited

U.S. PATENT DOCUMENTS

| | | |
|---|---|---|
| 5,761,649 A | 6/1998 | Hill |
| 5,940,509 A | 8/1999 | Jovanovich et al. |
| 5,949,883 A | 9/1999 | Ford |
| 6,003,117 A | 12/1999 | Buer et al. |
| 6,081,901 A | 6/2000 | Dewa et al. |
| 6,094,485 A * | 7/2000 | Weinstein et al. ............... 380/30 |
| 6,101,605 A | 8/2000 | Buer |
| 6,260,132 B1 | 7/2001 | Buer |
| 6,397,330 B1 * | 5/2002 | Elgamal et al. ............... 713/164 |
| 6,502,131 B1 * | 12/2002 | Vaid et al. ..................... 709/224 |
| 6,624,388 B1 * | 9/2003 | Blankenship et al. ..... 219/130.5 |
| 6,700,964 B2 * | 3/2004 | Schmid et al. ................ 379/189 |
| 6,789,159 B1 | 9/2004 | Carr et al. |
| 6,802,015 B2 | 10/2004 | Atkinson |
| 7,089,420 B1 | 8/2006 | Durst et al. |

(Continued)

FOREIGN PATENT DOCUMENTS

EP    0 731 406 A1    9/1996

(Continued)

OTHER PUBLICATIONS

Refik Molva, Authentication of Mobile User, Mar. 1994, IEEE, vol. 8, Issue 2, pp. 3-9.*

(Continued)

*Primary Examiner* — Nathan Flynn
*Assistant Examiner* — Viral Lakhia
(74) *Attorney, Agent, or Firm* — Sterne, Kessler, Goldstein & Fox PLLC

(57) ABSTRACT

Systems and methods are disclosed for using cryptographic techniques to configure data processing systems. A configuration manager cryptographically controls the configuration of a system by ensuring that only authorized users or applications can change the configuration. For example, requests to change configuration information may include authenticated and/or encrypted data. These cryptographic techniques are employed to enable and/or disable functions, features and capabilities of a system. For example, a system may be reconfigured to provide strong or weak encryption based on parameters in the configuration information.

28 Claims, 12 Drawing Sheets

U.S. PATENT DOCUMENTS

| | | | |
|---|---|---|---|
| 7,131,004 B1* | 10/2006 | Lyle | 713/169 |
| 7,260,726 B1* | 8/2007 | Doe et al. | 713/189 |
| 7,536,548 B1* | 5/2009 | Batke et al. | 713/166 |
| 7,567,672 B2* | 7/2009 | Furukawa | 380/255 |
| 2001/0005885 A1* | 6/2001 | Elgamal et al. | 713/164 |
| 2001/0014150 A1* | 8/2001 | Beebe et al. | 379/189 |
| 2002/0169874 A1 | 11/2002 | Batson et al. | |
| 2003/0018786 A1* | 1/2003 | Lortz | 709/226 |
| 2003/0025689 A1 | 2/2003 | Kim | |
| 2003/0041091 A1* | 2/2003 | Cheline et al. | 709/200 |
| 2003/0074568 A1* | 4/2003 | Kinsella et al. | 713/186 |
| 2003/0091193 A1* | 5/2003 | Bunimov et al. | 380/278 |
| 2003/0177389 A1* | 9/2003 | Albert et al. | 713/201 |
| 2003/0229811 A1* | 12/2003 | Siegel et al. | 713/202 |
| 2003/0233571 A1 | 12/2003 | Kraus et al. | |
| 2004/0039954 A1* | 2/2004 | White et al. | 713/322 |
| 2005/0204154 A1* | 9/2005 | Osaki | 713/193 |
| 2010/0289627 A1* | 11/2010 | McAllister et al. | 340/10.42 |

FOREIGN PATENT DOCUMENTS

| | | |
|---|---|---|
| EP | 1 102 152 A2 | 5/2001 |
| WO | WO 00/10283 | 2/2000 |

OTHER PUBLICATIONS

U.S. Appl. No. 10/141,197 entitled, "System and Method for Configuring Device Features Via Programmable Memory," filed May 8, 2002.

Communication from the European Patent Office dated May 23, 2005; European Search Report for Application No. 03017103.

* cited by examiner

SYSTEM AND METHOD FOR CONTROL OF SECURITY CONFIGURATIONS

CROSS-REFERENCE TO RELATED APPLICATIONS

This application is a continuation of U.S. application Ser. No. 10/207,332, titled, "System and Method for Cryptographic Control of System Configurations," filed Jul. 29, 2002.

FIELD OF THE INVENTION

The invention relates generally to the field of data processing and, more particularly, to systems and methods for using cryptographic techniques to configure data processing systems.

BACKGROUND OF THE INVENTION

The field of data processing encompasses a variety of systems and processes including, for example, computers, data networks, communications devices and associated processes. Data processing systems such as these perform a variety of operations. For example, a computer may execute different applications. Data network components may support a variety of data format standards and transfer data at a variety of data rates. A communication device may support a variety of protocols.

Many conventional data processing systems are configurable. For example, a computer may be configured to invoke particular applications when it is reset. A data network device may be configured to support a particular data rate when it is first powered on.

Some systems may be configured "in the field." That is, the system may be configured after it has been shipped from the manufacturer to a customer. This may be accomplished, for example, by modifying configuration information associated with the system.

Typically, a configurable system will include one or more data registers to store the configuration information. Thus, these systems may be configured and/or reconfigured by changing the configuration information in the register. During operation, the system accesses the configuration information and performs operations associated with that particular configuration.

Conventional data memories used to store configuration information include, for example, hard-wired registers, one-time programmable ("OTP") data memories and, in some cases, reprogrammable memories such as random access memory ("RAM"). Hard-wired registers typically are programmed at the factory. For example, a fusable register in an integrated circuit may be blown before the integrated circuit is sent to a customer. OTP devices, as their name implies, may be programmed once. These devices may be used where it is desirable to configure a system in the field only one time. Reprogrammable memories may be used where it is desirable to reconfigure a system more than one time.

Data memories devices such as these may have disadvantages in some applications. For example, hard-wired devices typically are not field programmable. OTP devices cannot used in systems that need to be reconfigured more than once. Reprogrammable memories are susceptible to being re-written by unauthorized parties. As a result, a need exists for improved systems and methods for configuring data processing systems and processes.

BRIEF SUMMARY

The invention relates to methods and associated systems using cryptographic techniques to configure data processing systems and processes. That is, cryptographic techniques may be employed to enable and/or disable functions, features and capabilities of a system or process.

A device constructed according to one embodiment of the invention cryptographically controls the configuration of a system by ensuring that only authorized users or applications can change the configuration. For example, a configuration manager may control the configuration of a data processing system by restricting access to the configuration information for the system. In one embodiment, requests to change the configuration information include information encoded by an authentication algorithm and/or encrypted using a key. For example, the configuration information may be encoded and/or encrypted using a key. The configuration manager authenticates and/or decrypts the information to ensure that the request is from a source having access to the key. Thus, the configuration manager will change the configuration information only in response to a request from an authorized source. In a system that uses encryption and authentication, after the configuration manager decrypts the information, it verifies that the request is valid by, for example, verifying that the configuration information is valid. In one embodiment the configuration manager authenticates the configuration information by checking the configuration information using a message authentication code.

A device constructed according to one embodiment of the invention cryptographically controls the cryptographic capabilities of a system. The system may be configured to employ either strong encryption or weak encryption (e.g., encryption technology that may be legally exported to other countries). Such a system may be configured upon reset to employ weak encryption.

In accordance with one embodiment of the invention, the system uses cryptographic control to reconfigure the system to employ strong encryption. A configuration manager controls access to the encryption configuration information. For example, the configuration manager processes all requests to change the configuration information. However, the configuration manager changes the encryption configuration information only in response to requests that include information that may be authenticated and decrypted using the appropriate keys. Thus, use of strong encryption may be limited to authorized users.

Significantly, this embodiment of the invention may relieve a system manufacturer of some of the burdens associated with export control laws. For example, by shipping all systems with weaker encryption the manufacturer may be able to avoid the registration process required for systems employing strong encryption. Instead, the burden of registration may be placed on those users wishing to employ strong encryption.

In one embodiment, a user who wishes to enable strong encryption uses a website to register according to export control law. After the user has received authorization to enable strong encryption, the website sends the user an upgrade utility. The user may then use the upgrade utility to send an appropriate reconfiguration request (e.g., one that includes encrypted information) to the configuration manager.

Other embodiments of the invention include cryptographic techniques for enabling and/or disabling a variety of functions, features and capabilities of a system. For example, a device constructed according to various embodiments of the invention may cryptographically control the operating speed of a device or may enable and disable the operation of various processing modules in a device.

BRIEF DESCRIPTION OF THE DRAWINGS/FIGURES

These and other features, aspects and advantages of the present invention will be more fully understood when considered with respect to the following detailed description, appended claims and accompanying drawings, wherein:

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
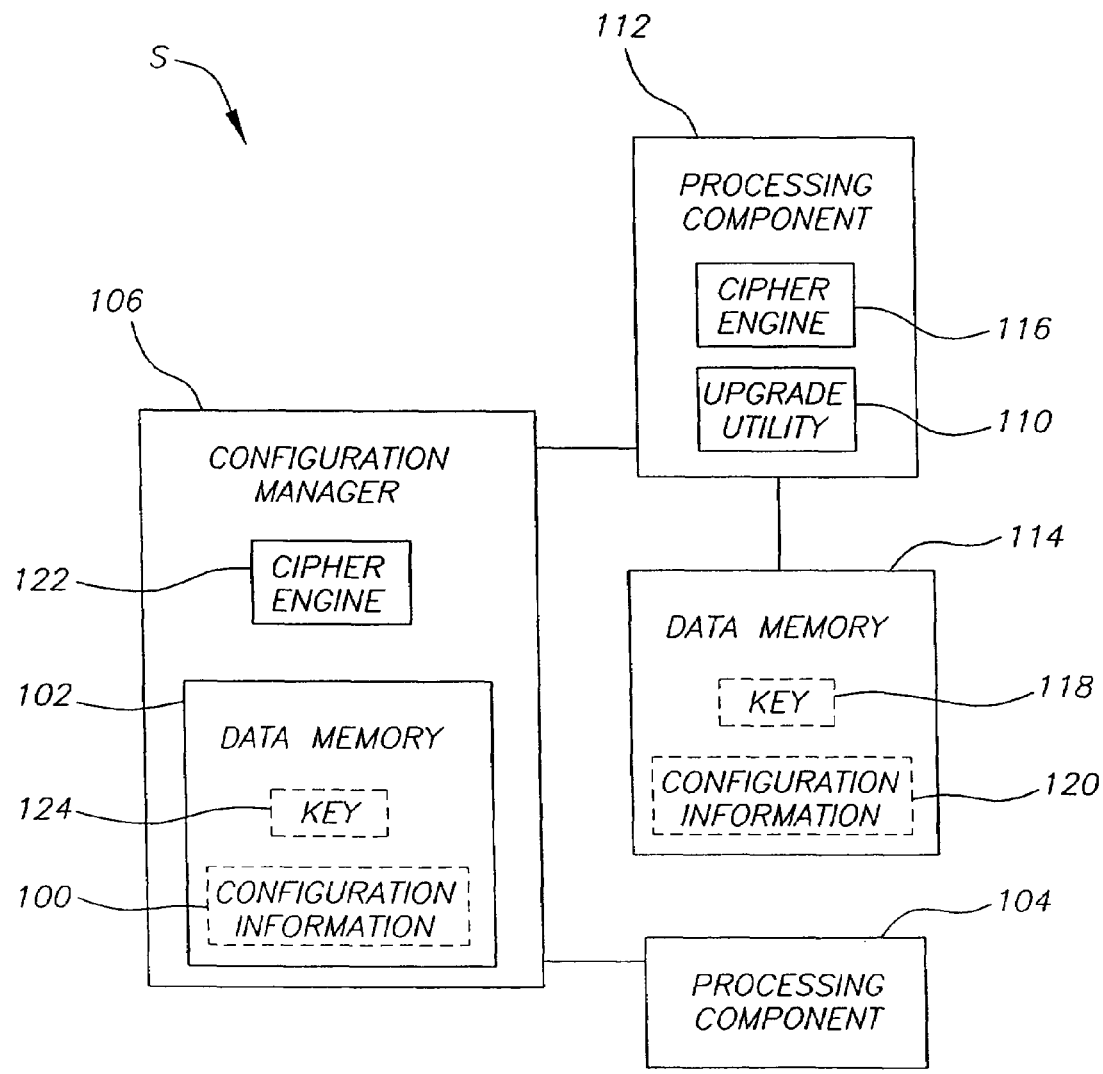
FIG. 1 is a block diagram of one embodiment of a configuration system constructed in accordance with the invention.

FIG. 1 is a block diagram of one embodiment of a configuration control system S constructed in accordance with the invention. Components in the system operate, in part, according to configuration information 100 stored in a data memory 102. For example, a processing component 104 may be disabled when a particular flag in the configuration information 100 is set to zero.

A configuration manager 106 controls access to the configuration information 100 stored in the data memory 102. This access control may be implemented, for example, by routing the control signals for an external data memory device (not shown) only to the configuration manager 106. In the embodiment of FIG. 1, access control is implemented by locating the data memory 102 in the configuration manager 106.

In accordance with one embodiment of the invention, the configuration manager 106 cryptographically controls modification of the configuration information 100. For example, a request to change the configuration information 100 must include data that can be authenticated and/or data that was encrypted using an authorized cipher key.

Figure 2:
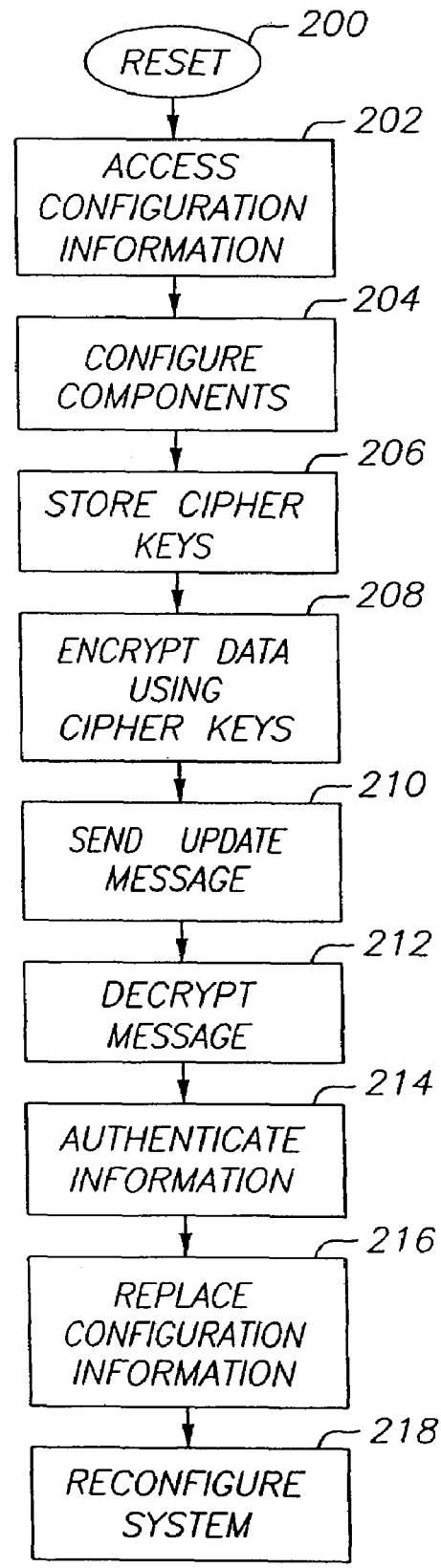
FIG. 2 is a flowchart representative of one embodiment of operations that may be performed in accordance with the embodiment of FIG. 1.

The operation of the embodiment of FIG. 1 will be treated in more detail in conjunction with the operations described in the flowchart depicted in FIG. 2.

After the system S is reset as represented by block 200, some of the components (e.g., processing component 104) in the system may access initialization configuration information (e.g., flag bits and variables) 100 stored in the data memory 102 (block 202). These components may then configure themselves according to this configuration information (block 204). For example, the processing component 104 may initially be disabled, pending activation at some later point in time.

A configuration upgrade utility 110 executing, for example, on a processing component 112 cooperates with the configuration manager 106 to change the configuration of the system. In accordance with this embodiment of the invention, the upgrade utility 110 sends a configuration upgrade message to the configuration manager 106. The message may include data processed by an authentication algorithm and a key and/or encrypted with a cipher key. To this end, the configuration upgrade utility 110 and the configuration manager 106 must have compatible encryption and decryption keys for the authentication and encryption/decryption operations. Thus, as represented by block 206, keys are stored in association with the configuration upgrade utility 110 and the configuration manager 106.

The encryption and decryption cipher keys (hereafter "keys") may be symmetric or asymmetric. In symmetric cryptographic systems identical cipher keys are used to encrypt and decrypt the data. In asymmetric cryptographic systems public and private cipher keys are used to encrypt and decrypt the data.

Keys may be stored in data memories when the system is manufactured. In this case, the data memories may be non-volatile memories ("NVM") such as EEPROM or battery backed-up memory.

The keys may be loaded into the data memories when the system has been installed in the field. This may involve the use of secure methods to transmit the keys as discussed in detail below.

To prevent unauthorized parties from gaining access to the keys, the devices that use and store the keys typically are protected by, for example, applying tamper evident coatings such as epoxy to the devices. In the example of FIG. 1 protected devices typically would include the configuration manager 106 and the processing component 112. In addition, when the keys are stored in external data memories (e.g., 114) rather than in data memories in the configuration manager 106 and the processing component 112 devices, the data memories may be protected in this manner as well.

As represented by block 208, a cipher engine 116 in the processing component 112 encrypts data using the cipher key 118 associated with the configuration upgrade utility 110. In one embodiment of the invention, the encrypted data includes the new configuration information 120.

As represented by block 210, the configuration upgrade utility 110 sends a message to the configuration manager 106 to update the configuration information 100. This message includes encrypted data as discussed above.

When the configuration manager 106 receives the message, a cipher engine 122 decrypts the encrypted data (e.g., configuration information) using the cipher key 124 associated with the configuration manager 106 (block 212).

In one embodiment, the new configuration information is associated with (e.g., includes) authentication information. Thus, as represented by block 214, the configuration manager 106 may perform an authentication operation on the authentication information to ensure that the new configuration information is valid. Authentication may be performed, for example, using algorithms such as SHA-1 or DSA.

If the new configuration information is valid, the configuration manager 106 replaces the old configuration information 100 in the data memory 102 with the new configuration information (block 216).

Then, depending on the particular application, the systems is reconfigured or may operate in a different manner according to the new configuration information 100 (block 218). For example, when an application executes in the processing component 104 the application may periodically read the configuration information 100 to determine the desired sequence of operations.

Figure 3:
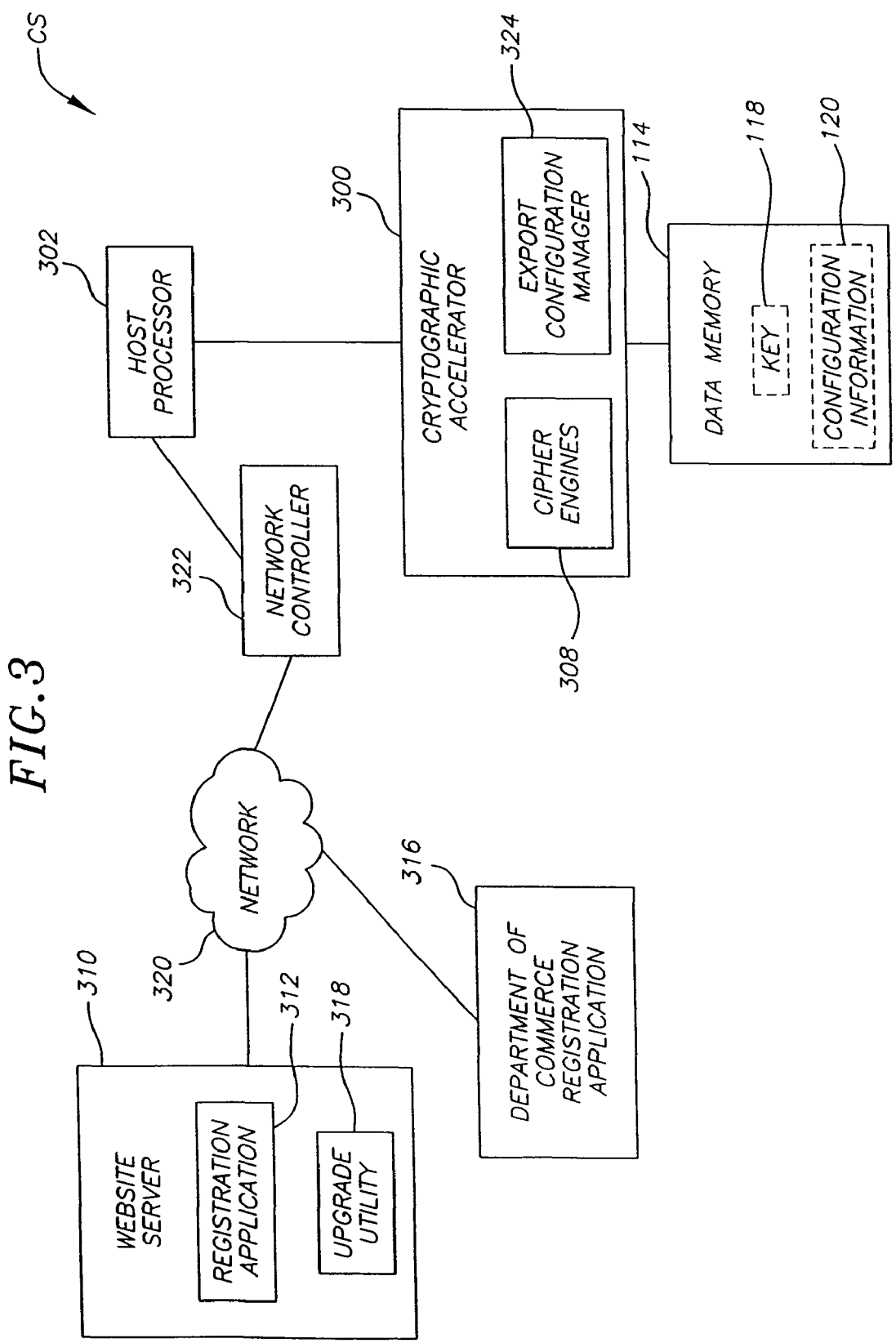
FIG. 3 is a block diagram of one embodiment of a cryptographic system constructed in accordance with the invention.

Referring now to FIG. 3, another embodiment of the invention will be discussed. Here, cryptographic techniques are employed to control whether a system CS employs strong encryption or weak encryption. Weak encryption refers to an encryption algorithm that employs a key having a size less than 65 data bits. Strong encryption refers to an encryption algorithm that employs a key having a size greater than 64 data bits.

Export regulations in some countries prevent the exportation of hardware and/or software that employ strong forms of encryption. For example, in the United States a license from the Department of Commerce is required to export cryptography hardware or software that employs strong encryption. An example of a standard that may incorporate weak encryption is the Data Encryption Standard ("DES"). Examples of standards that may incorporate strong encryption include the triple Data Encryption Standard ("3DES") and the Advanced Encryption Standard ("AES"). Thus, one example of a definition of weak versus strong encryption, refers to the length of the key. It should be appreciated, however, that alternative definitions of weak versus strong encryption may be employed. For example, the weak versus strong threshold may be set at a longer or shorter length of key (e.g., 128 bits). Also, the definition may simply refer to the type of encryption, for example, AES.

To maintain manufacturing efficiency, it is preferable to manufacture a single device, rather than separate devices, to support weak and strong encryption. Also, due to the paperwork involved in obtaining export licenses for devices that are exported, there are advantages to making the devices default to weak encryption. To avoid an export license approval on a device that can support strong encryption, sufficient protections must be employed to prevent unauthorized users from enabling the strong encryption.

In accordance with this embodiment of the invention, a cryptographic device that supports strong and weak encryption may only be configured to employ strong encryption through the use of a secured cipher key. That is, only authorized users are allowed to reconfigure the device to perform strong encryption. To this end, the key is protected to prevent unauthorized users from accessing the key.

In FIG. 3 a cryptographic accelerator 300 may be configured to employ either strong encryption or weak encryption. In general, a cryptographic accelerator is a dedicated processing device that include relatively fast cipher engines for executing cipher algorithms. A cryptographic accelerator typically is used to offload encryption/decryption processing from a host processor (e.g., 302).

The cryptographic accelerator 300 is configured according to configuration information 304 stored in a data memory 306. For example, when a domestic/export flag in the configuration information 304 is set to a one, cipher engines 308 in the cryptographic accelerator 300 employ strong encryption. When the domestic/export flag in the configuration information 304 is set to a zero, the cipher engines 308 employ weak encryption.

To configure the system to use strong encryption (i.e., enable domestic mode) a user of the system must obtain an upgrade utility. In the embodiment of FIG. 3, this is accomplished via a website server 310. The website server 310 includes applications (e.g., 312) that enable the user to register with the Department of Commerce and, if authorized, send an upgrade utility to the user. The user then executes the upgrade utility on the host processor 302 to set the domestic/export flag to domestic mode.

Figure 4:
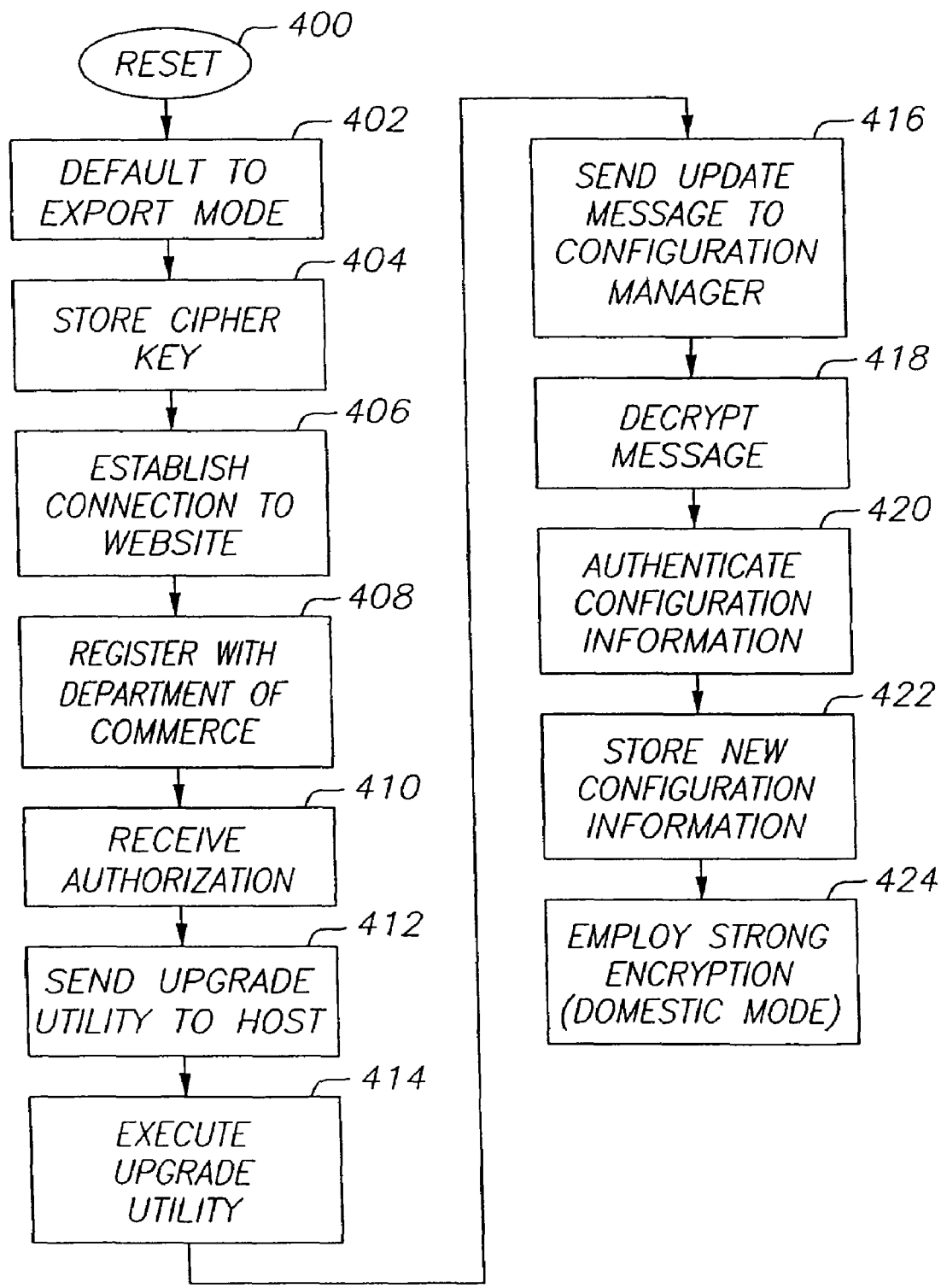
FIG. 4 is a flowchart representative of one embodiment of operations that may be performed in accordance with the embodiment of FIG. 3.

The operation of the embodiment of FIG. 3 will be treated in more detail in conjunction with the operations described in the flowchart depicted in FIG. 4.

After the system CS is reset as represented by block 400, the domestic/export flag will be set to a zero (block 402). Thus, by default, the cryptographic accelerator 300 will operate in export mode.

As represented by block 404, one or more keys 314 are stored in the data memory 306. The keys 314 are compatible with the keys associated with an upgrade application (discussed below) that will be used to update the new configuration information. As discussed above in conjunction with FIGS. 1 and 2, access to the contents of the data memory 314 may be restricted. In addition, if the data memory 306 is located external to the cryptographic accelerator 300 as shown in FIG. 3, it may be protected using epoxy or other methods.

As represented by block 406, when the user of the host processor 302 wishes to use domestic mode, the user uses an application on the host processor 302 to connect via a data network 320 to a website served by the server 310. The website application 312 allows the user to register with a Department of Commerce registration application 316 via the data network 320 (block 408).

In one embodiment, the upgrade utility 318 consists of an application that can generate messages that are sent to the cryptographic accelerator to change the configuration information. In addition, the upgrade utility 318 may contain configuration information that has been processed by an authentication algorithm and encrypted. For example, other applications (not shown) use keys compatible with keys 314 to perform authentication and encryption processes an configuration information that is compatible with the configuration information 304.

If the user receives authorization to use the domestic mode (block 410), an application on the server 310 sends the upgrade utility 318 to the host processor 302 via the data network 328 (block 412). Then, the user executes the upgrade routine on the host processor 302 (block 414). In an alternative embodiment, an application on the server 310 executes the upgrade utility 318. In this case, the server 310 may establish a connection with the cryptographic accelerator 300 via the data network 320.

As represented by block 416, the upgrade utility sends an encrypted message to the configuration manager 300. This message includes configuration information with the domestic/export flag set to domestic mode. This message also includes information associated with a message authentication code that is used to verify that the new configuration information has not been corrupted. In addition, the message may contain a sequence number as discussed below.

When the configuration manager 300 receives the message as represented by block 418, a cipher engine 308 decrypts the message using the cipher key 314. As represented by block 420, the export configuration manager 324 authenticates the decrypted configuration information to ensure that the new configuration information is valid.

If the new configuration information is valid, the export configuration manager 324 replaces the old configuration information 304 in the data memory 304 with this new configuration information, including the new value for the domestic/export flag (block 422).

Thus, when the cryptographic accelerator 300 performs cryptographic operations, the cipher engines 308 may employ the larger keys used in strong encryption (block 424).

Figure 5:
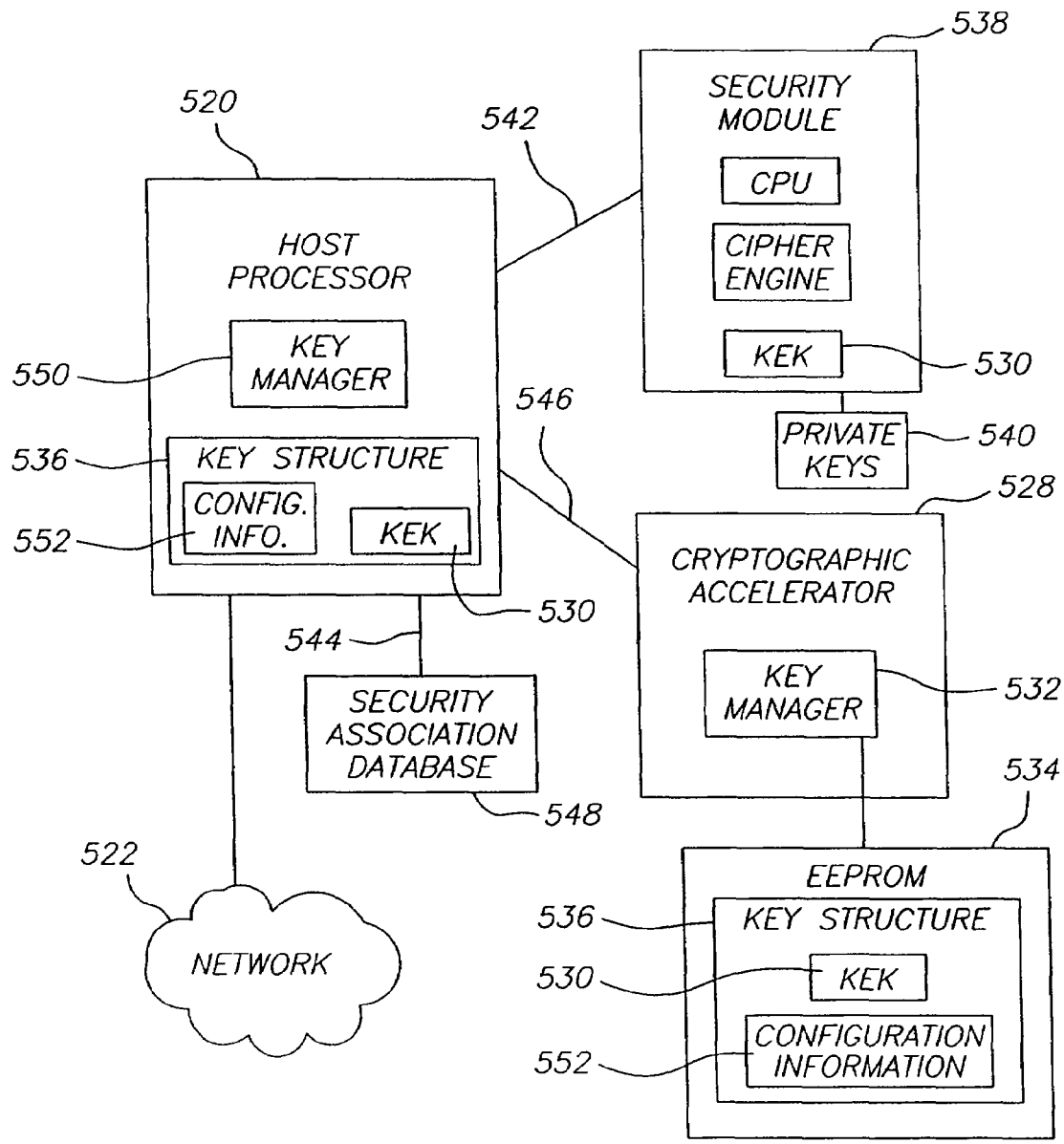
FIG. 5 is a block diagram of one embodiment of a cryptographic system in a packet data network constructed in accordance with the invention.

Referring now to FIG. 5, an example embodiment of a cryptographic system in a data network will be discussed. In practice, an actual embodiment of the invention may not include all of aspects of the embodiment of FIG. 5. Rather, the components are shown collectively for convenience of explanation.

In FIG. 5, a host processor 520, a cryptographic accelerator 528 and a security module 538 use cryptographic techniques to send sensitive information to one another. For example, as discussed below these components may send private keys and session keys to one another.

The system includes a non-volatile memory 534 (e.g., an EEPROM) and a key manager 532 that may comprise a "protected portion" of the system. In addition, the system may be configured so that only the key manager 532 has access to the portion of the non-volatile memory 534 that contains sensitive data. In addition, the non-volatile memory device 534 may be protected by epoxy or some other means. Alternatively, to control access to the non-volatile memory 534, the non-volatile memory 534 may be integrated into the key manager's integrated circuit.

In accordance with one embodiment of the invention these cryptographic techniques are used to control configuration information for the cryptographic accelerator 528. In this embodiment, a key manager 532 performs configuration manager operations similar to those discussed herein.

The security module 538 stores private keys 540 and controls the generation of keys. The majority of the cipher processing, however, is performed by the cryptographic accelerator 528.

Moreover, when the host processor 520 establishes secure sessions over the network, sets of session keys are needed to encrypt and decrypt the session packets. Again, the majority of the cipher processing is performed by the cryptographic accelerator 528.

Hence, the system must provide a secure method for transferring keys between the cryptographic accelerator 528, the security module 538 and the host processor 520. Moreover, in accordance with one embodiment of the invention, these components of the system check the state of the domestic/export mode to determine the type of encryption that may be employed for encryption operations.

The embodiment of FIG. 5 may use symmetric and/or asymmetric keys. The components use symmetric keys to send most of the sensitive data between the components. This is because symmetric cipher operations typically are less complex than asymmetric cipher operations. However, the symmetric keys must be distributed to the components in the system. Although symmetric keys could be stored in the data memories at the time of manufacture, this approach is not well suited for applications that need to change keys. A more flexible approach involves using asymmetric keys to distribute symmetric keys between the components.

In summary, the system may utilize a symmetric key exchange or an asymmetric key exchange. These aspects of the system are treated in more detail below, after an initial discussion of the how the symmetric keys are used in the system.

The host processor 520 may use a symmetric key to encrypt information sent to the cryptographic accelerator 528. For example, the host processor 520 may send encrypted session keys and configuration information to the cryptographic accelerator. In this case, the symmetric key is called a key encryption key ("KEK") 530.

The cryptographic accelerator 528, in turn, includes a decryption circuit (not shown) that uses a KEK 530 from key structure 536 to decrypt the encrypted information. For convenience the term "security association" will be used herein to refer to key information. This key information may include, for example, a key or keys, one or more encrypted keys and associated identifiers and other information such as rules relating to how to use the keys and the types of algorithms that may be used to decrypt the keys.

A key manager 532 in the cryptographic accelerator 528 cooperates with a key manager 550 in the host processor 520 to ensure that both have a compatible KEK 530. In a system that employs a symmetrical key exchange, provisions are made to ensure that both key managers 532 and 550 have access to the same initial KEK 530 when the system is operated for the first time. For example, KEK 530 may be stored in nonvolatile memories associated with each key manager when the system is manufactured.

Under the symmetric key exchange, when the host processor 520 changes KEK, 550 provisions are made for modifying the KEK 530 used by the key manager 532. In one embodiment, the host processor 520 modifies KEK 530 using a key structure 536 that includes flags 552 and a new KEK 530. This embodiment is discussed in more detail below in conjunction with FIG. 9.

An example of a use of asymmetric keys will now be discussed. The asymmetric keys can be established using standard zero knowledge authentication techniques including, for example, DSA or digital signal algorithms. Briefly, when the cryptographic accelerator 528 is manufactured, a private key (not shown) is stored in the EEPROM 534. As discussed above, this EEPROM typically is protected with epoxy or some other method. In addition, a signed public key for the cryptographic accelerator 528 may be stored in the EEPROM 534 or some other data memory. The signed public key, commonly referred to as a certificate, provides verification from a trusted source that the public key is valid. The cryptographic accelerator 528 sends the public key to the security module 538. The security module 538 uses the public key to authenticate the identity of the cryptographic accelerator 528. The two components then perform a complementary procedure where the security module 538 sends its public key to the cryptographic accelerator 528.

Once the security module 538 and the cryptographic accelerator 528 have established a secure method of communicating. The security module 538 may send data to the cryptographic accelerator 528 using the cryptographic accelerator's public key.

Accordingly, the security module 538 creates KEK 530, encrypts it using the cryptographic accelerator's public key, then sends the encrypted KEK to the cryptographic accelerator 528. After decrypting the encrypted KEK, the cryptographic accelerator 528 uses KEK 530 to decrypt keys sent from the security module 538 to the cryptographic accelerator 528. In particular, the security module 538 encrypts the host processor's 520 private keys and sends them to a private key database (not shown). These private keys are then used in conjunction with secured sessions established over the data network 522.

Figure 6:
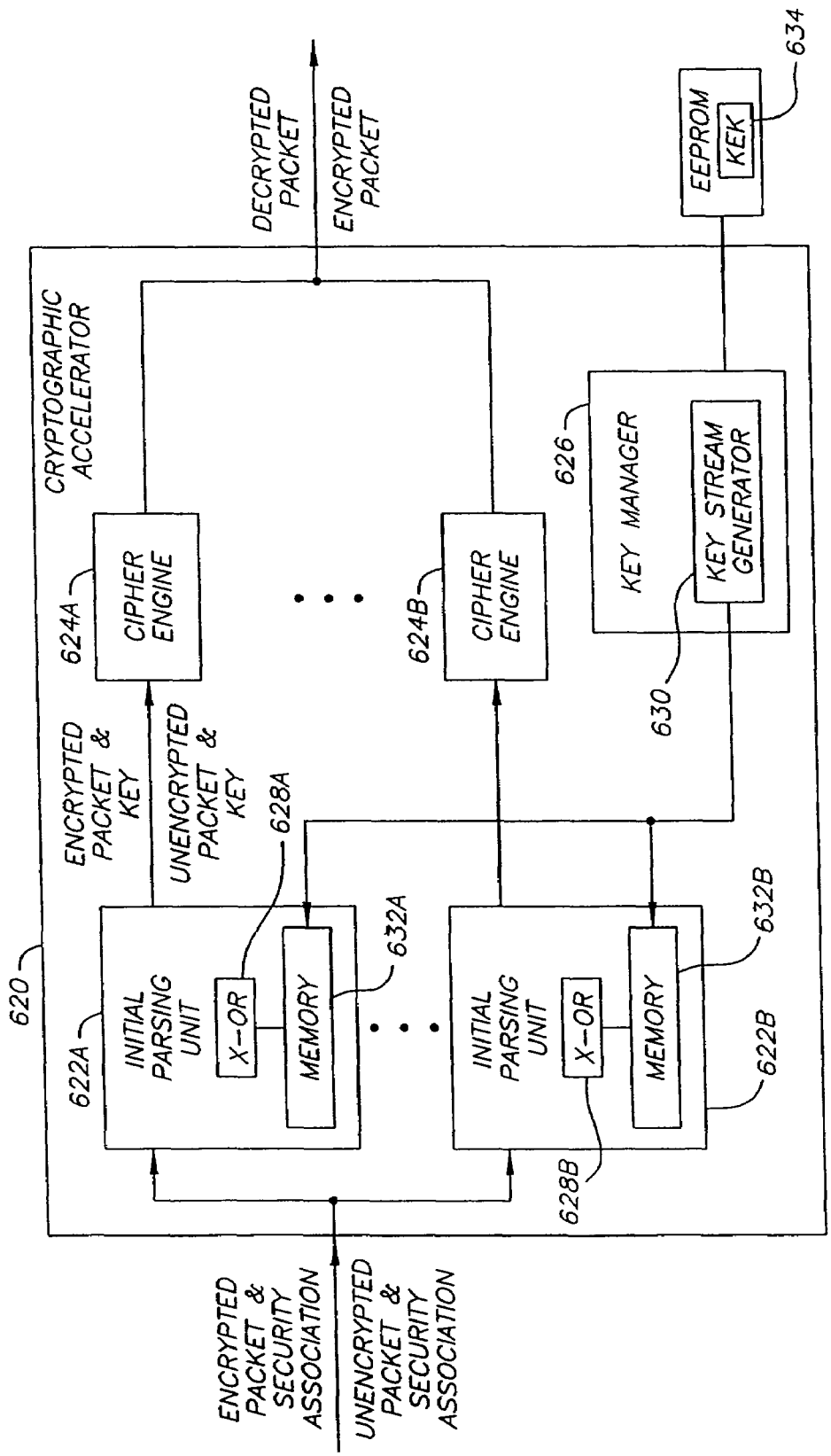
FIG. 6 is a block diagram of one embodiment of a cryptographic accelerator constructed in accordance with the invention.
Figure 7:
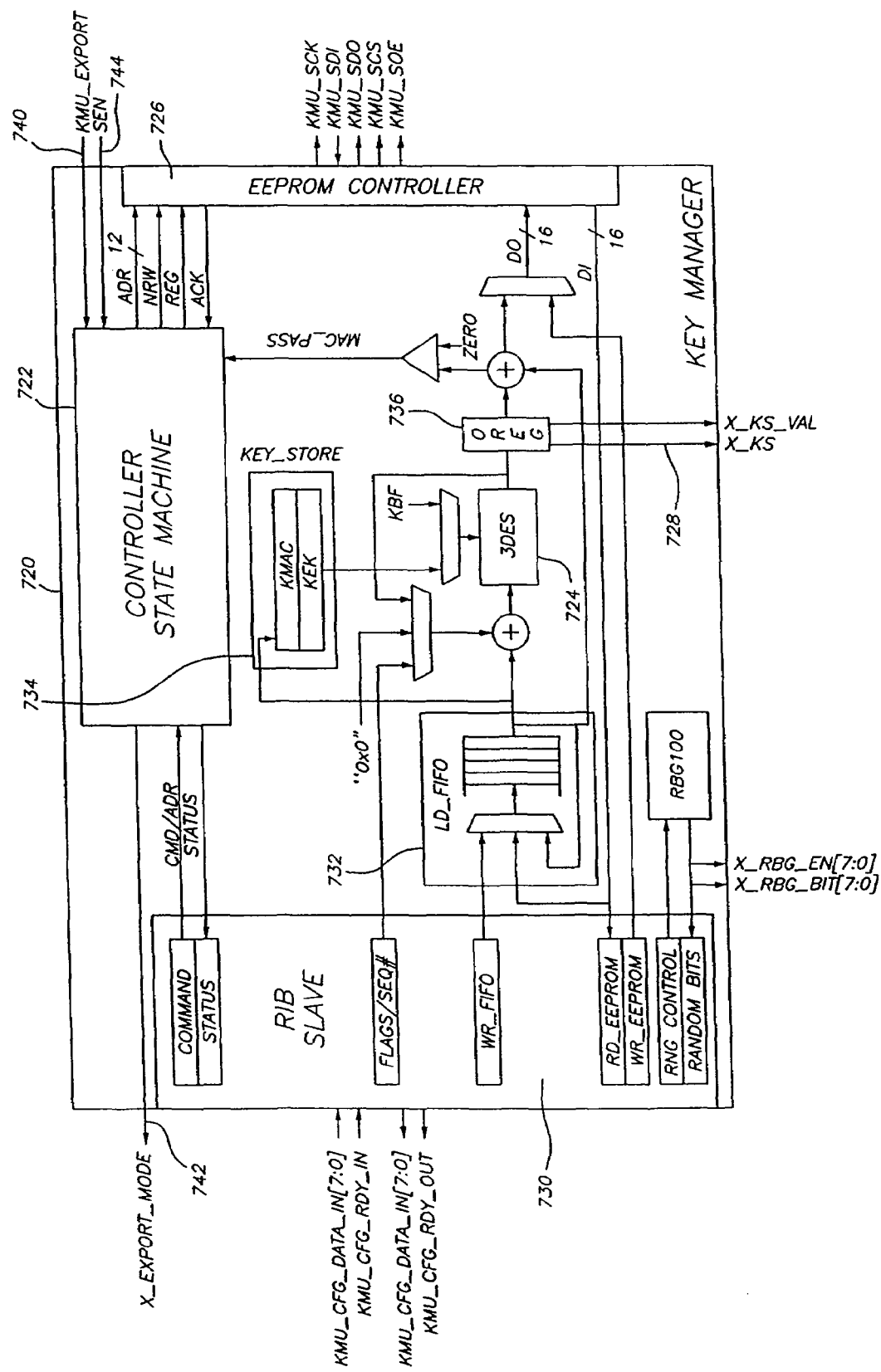
FIG. 7 is a block diagram of one embodiment of a key manager constructed in accordance with the invention.

Referring now to FIGS. 6 and 7, the structure of one embodiment of a cryptographic accelerator and a key manager will be treated in more detail.

FIG. 6 depicts one embodiment of a cryptographic accelerator 620 that includes a stream cipher circuit for decrypting security associations. The primary function of the cryptographic accelerator 620 is to decrypt encrypted packets and encrypt unencrypted packets for a processor that handles packets routed to and from a network (e.g., a network controller/packet processor, not shown). Thus, the cryptographic accelerator 620 receives encrypted packets and associated encrypted security associations and outputs the decrypted packet, or it receives unencrypted packets and associated encrypted security associations and outputs the encrypted packet.

The cryptographic accelerator 620 includes one or more initial parsing units ("IPU") 622A and 622B, cipher engines 624A and 624B and a key manager 626. The IPUs 622A and 622B parse security association data from the encrypted/unencrypted packets to decrypt the encrypted security associations. The cipher engines 624A and 624B are processors that decrypt the encrypted packets and/or encrypt the unencrypted packets. In this embodiment, the cipher engines 624A and 624B are custom processors that use the decrypted security associations from the IPUs 622A and 622B to encrypt or decrypt packets. The key manager manages KEKs 634 used to decrypt the security associations.

In one embodiment, the IPU 622A, 622B includes a stream cipher circuit for decrypting the security associations. In this case, the key manager 626 includes a key stream generator 630 that generates a key stream based on KEK 634. The key manager 626 sends the key stream to each of the IPUs 622A, 622B where it is stored in a buffer 632A and 632B. The IPU 622A, 622B includes an exclusive-or circuit 628A, 628B that operates on the stored key stream and the encrypted security association to generate a decrypted security association. By implementing the security association decoding with such a simple circuit, a device constructed according to the invention can process packet data at gigabit data rates without a degradation in performance, using a relatively inexpensive architecture.

The IPU 622A, 622B sends the decrypted security association to the cipher engine 624A, 624B. Thus, the cipher engine 624A, 624B receives the encrypted packet or the unencrypted packet, a decrypted key from the security association and, in some embodiments, other information needed for the decryption operation.

The cipher engine 624A, 624B decrypts/encrypts the encrypted/unencrypted packet using the key and sends the decrypted/encrypted packet back to the processor (e.g., the network controller/packet processor). In accordance with this embodiment of the invention, the type of encryption/decryption employed by the cipher engines depends on the state of the domestic/export mode.

FIG. 7 depicts one embodiment of a key manager 720. The primary function of the key manager 720 is to provide the KEK or associated stream to a decryption engine that decrypts security associations such as session keys (e.g., an IPU, not shown). To this end, the key manager 720 communicates with a processor that generates keys (e.g., a host processor or security processor, not shown).

The key manager 720 includes a controller state machine 722 that controls the overall operation of the key manager 720, including the operation of a triple DES ("3DES") core 724 and an EEPROM controller 726.

The 3DES core 724 performs authentication and encryption operations. The 3DES core 724 supports 3DES-CBC Encrypt (MAC) and 3DES-OFB Encrypt. In this embodiment, the CBC encryption operation used for MAC (message authentication code) mode and OFB encrypt/decrypt mode use the same hardware structure. Here, the CBC encryption operation involves exclusive-ORing plain text data with the initial vector or previous encrypted block of data. The OFB operation may be performed on the same hardware using all zeros for the plain text. The resulting data is the key stream output via line 728. Details of CBC and OFB modes of operation for DES/3DES may be found in the publication FIPS-81 Modes of Operation.

The key manager 720 includes several data memories. The components 732, 734 and 736 typically provide temporary storage for key structures and other data. A control register 730 interfaces with the cryptographic accelerator to enable the cryptographic accelerator or, indirectly, another processor to control and receive information from the key manager 720. In particular, a host may read and write the configuration information via this register.

The controller state machine 722 performs the operations of a configuration manager as treated herein. These operations include controlling access to configuration information, updating the configuration information and setting default configuration values.

The domestic/export configuration information determines whether the cryptographic accelerator will employ strong encryption (domestic mode) or weak encryption (export mode). Export mode limits the encryption capability to a single 64 Bit DES key (56 bit usable key). Thus, the use of 168 bit keys for 3DES is disabled and AES capabilities are completely disabled.

The domestic/export mode may be set in two ways. First, the domestic/export flag ("domestic_en") in a KEK structure may be set. Second, the key manager 720 has an input signal kmu export 740 that may be driven to specify the mode.

The key manager 720 provides an output signal, export mode 742, that indicates the current domestic/export mode. The value of the export_mode signal 742 is based on the kmu export input signal 740 (typically connected to a device pin) and the domestic_en flag read from the key structure when the EEPROM (e.g., 640 in FIG. 6) is present.

If the serial EEPROM is known to be present, the kmu export pin should be set to '1' and the key manager will use the value of domestic_en from the key structure to determine the mode. If the serial EEPROM is not present, the domestic/export policy will be based on the signal level at the kmuexport pin. If the level is high (e.g., a one), the domestic policy is chosen. If the value is low (e.g., a zero), the export policy is chosen.

The cryptographic accelerator may read the domestic en flag by sending a request message to the key manager 720. The key manager 720 flags an error when the encryption request does not match the export policy.

To ensure that the domestic mode is enabled only when authorized, certain procedures are followed during initialization and configuration update operations. These procedures are discussed below.

Figure 8:
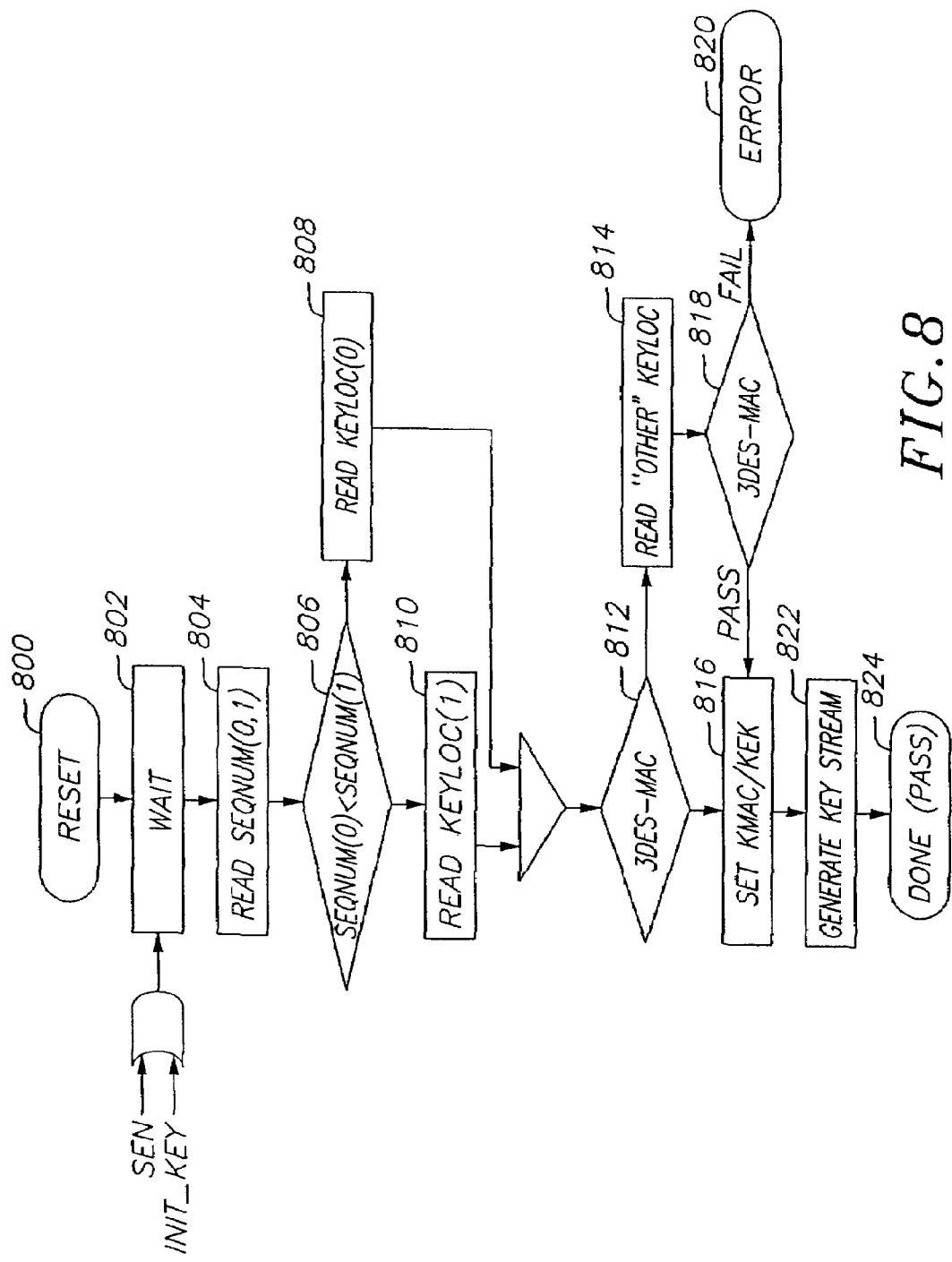
FIG. 8 is a flowchart representative of one embodiment of initialization operations that may be performed in accordance with the embodiment of FIG. 7.

Referring now to FIG. 8, one embodiment of start-up operations for the key manager will be discussed in detail. Upon reset (block 800), the key manager drives the export mode output to the "export" value of "one" (most conservative policy). In addition, the kmu_export input signal is sampled one clock cycle after reset.

Then, the key manager waits for the INIT KEY command (block 802). Optionally, an input signal SEN (serial EEPROM enabled) 744 may be used by an external device to initiate the INIT KEY command. The key manager reads the sequence number from both key locations in the EEPROM (block 804). The sequence numbers are compared to determine the "larger" of the two numbers (block 806). The key location with the largest sequence number is read from EEPROM by the key manager (blocks 808 or 810). The data read from the key location is verified using the DES-MAC algorithm with the initial vector=0 using a fixed internal key Kbf="reubkram" (block 812).

If the MAC passes, the correct key location has been selected. The key manager will then load the initial vector, KMAC and KEK values into internal registers (block 816). The Flags/SeqNum fields are set in a register that is readable by the host processor. These flags include domestic_en.

If the MAC fails, the other key location is used to repeat the MAC process (blocks 814 and 818). If both fail, the key manager enters an error state (block 820).

Once the proper key location has been determined in the initialization phase, the key manager will generate the key stream required for the security association decryption (block 822).

Figure 9:
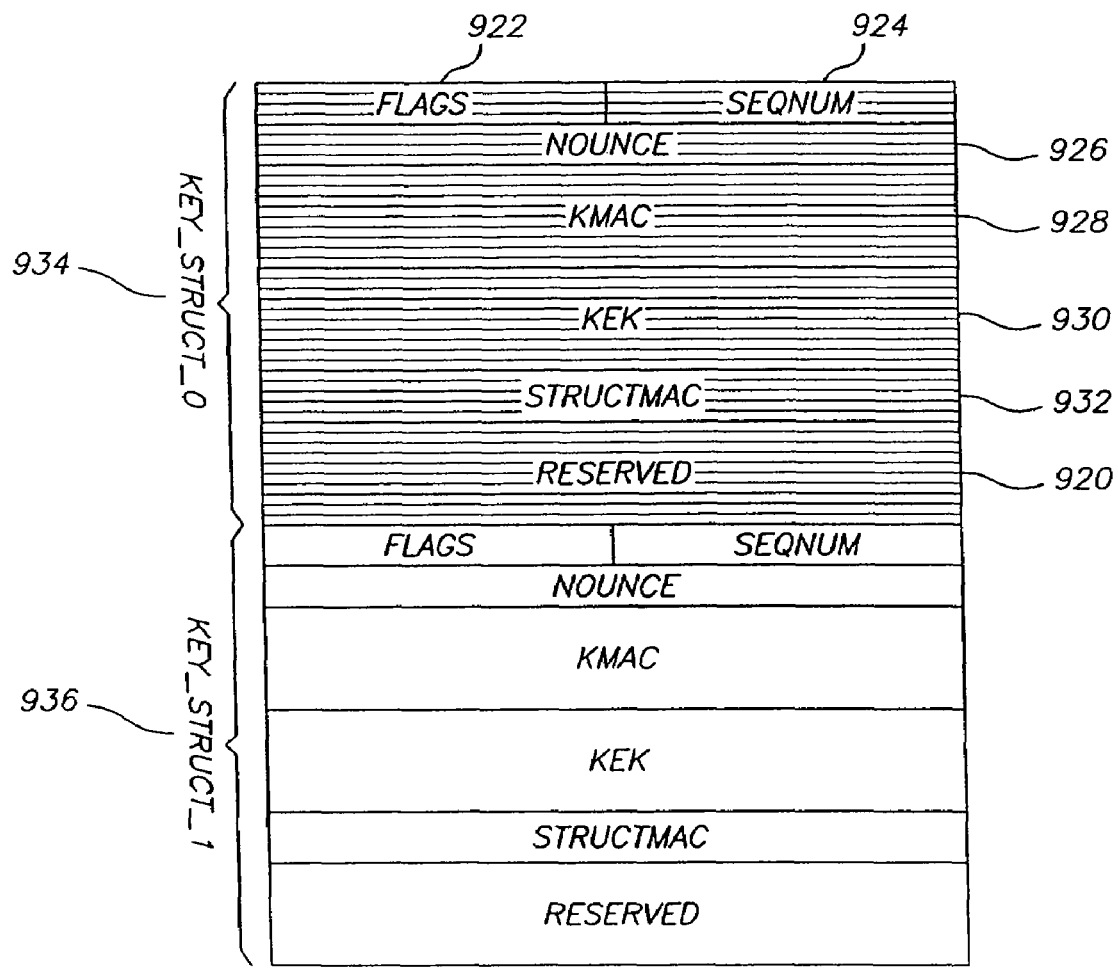
FIG. 9 is a representation of one embodiment of a key structure in accordance with the invention.

FIG. 9 depicts one embodiment of a key structure 934, 936 that may be used in conjunction with a symmetric KEK. The key structure includes configuration information in the form of flags 922 that may be used, for example, to designate the domestic/export mode, to designate whether the KEK value may be updated, and to enable a random bit generator. The sequence number (SeqNum) 924 is incremented for each new KEK value that is loaded into the key manager. NOUNCE 926 is a 32 bit random value that is used in combination with the sequence number to generate the initial vector for the encryption with the KEK. KMAC 928 contains the key used to authenticate an update key operation. KEK 930 is the key encryption key that is used to generate the key stream for decrypting the security associations. StructMAC 932 is the message authentication code for the key structure. This MAC is calculated using the initial vector=0 and Kbf internal key. As was discussed above in conjunction with FIG. 8, two key structures 934 and 936 are stored in the EEPROM.

Figure 10:
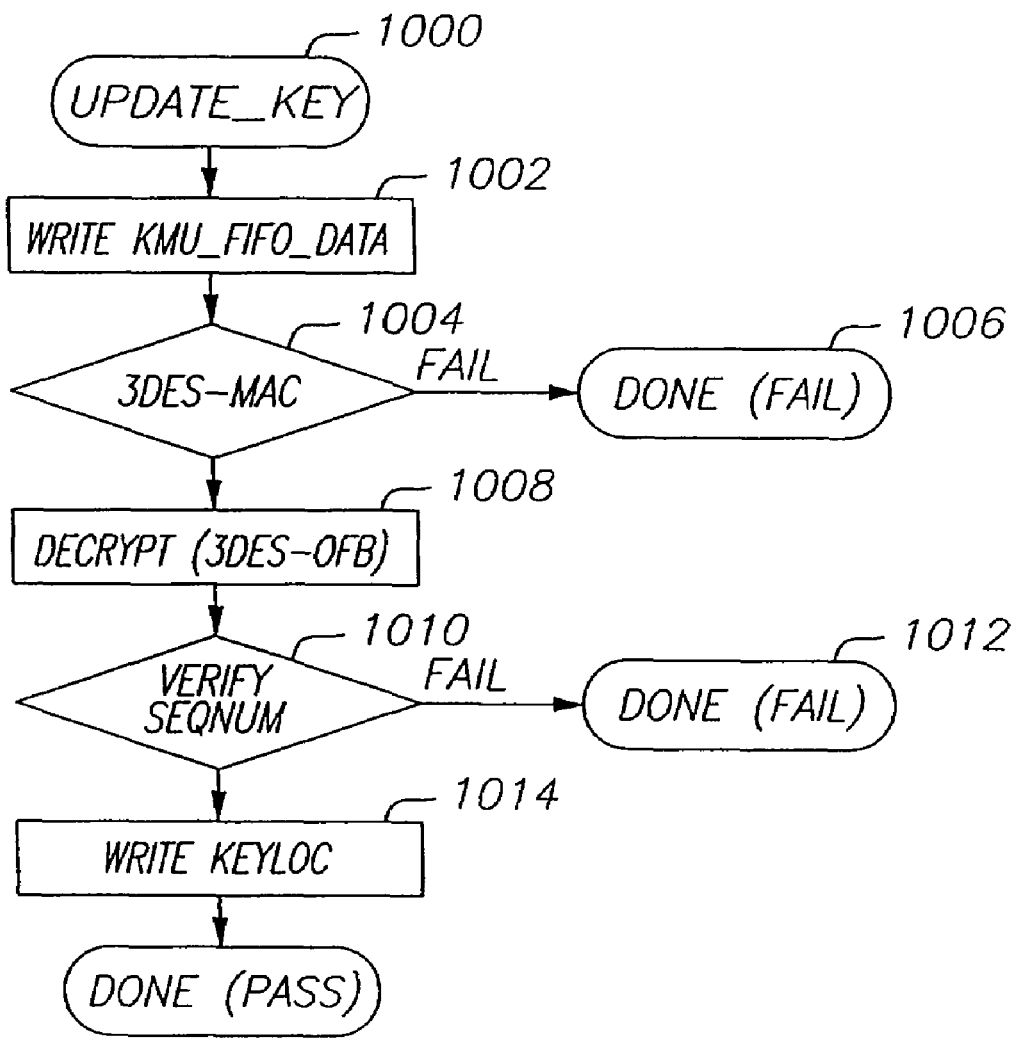
FIG. 10 is a flowchart representative of one embodiment of update operations that may be performed in accordance with the embodiment of FIG. 7.

FIG. 10 depicts key update operations that may be performed in conjunction with the key manager 720 of FIG. 7. A command to overwrite the serial EEPROM (and, consequently, the KEK structure including domestic_en) is provided in the form of register access packets. As discussed below, register data is decrypted using the current KEK and authenticated using 3DES-MAC.

In one embodiment that uses a symmetric key exchange procedure, the host processor 520 (FIG. 5) must know the previous key to change the current key. Initially, the host processor 520 fills the loading queue 732 with 48 bytes of the new encrypted version of the key location (including the MAC value). The host processor 520 fills the loading queue 732 using the write FIFO register 746 (block 1002). The key manager 720 uses 3DES-MAC with the KMAC key and initial vector equal to zero to authenticate the data in the loading queue 732 as the new key used by the key manager 720 (block 1004). If the authentication fails, the key manager 720 generates an error signal (block 1006).

If the authentication passes, the rest of the data (NOUNCE, new KMAC and new KEK) is decrypted using 3DES-OFB with the current KEK (block 1008). The decrypted sequence number (SeqNum) is verified to be the next incremented sequence number (i.e., one plus the sequence number that was advertised by the key manager) (block 1010). The decrypted value of the entire key structure (including the flags) is placed in the key location that was not loaded during the INITKEY command (block 1014).

In the case where KEK is established using an asymmetric key exchange procedure, KEK 530 may be updated by simply performing the asymmetric key exchange procedure again as described above in conjunction with FIG. 5. In this case, KEK may be updated without the security module 538 having to prove it knows the value of the previous KEK.

Figure 11:
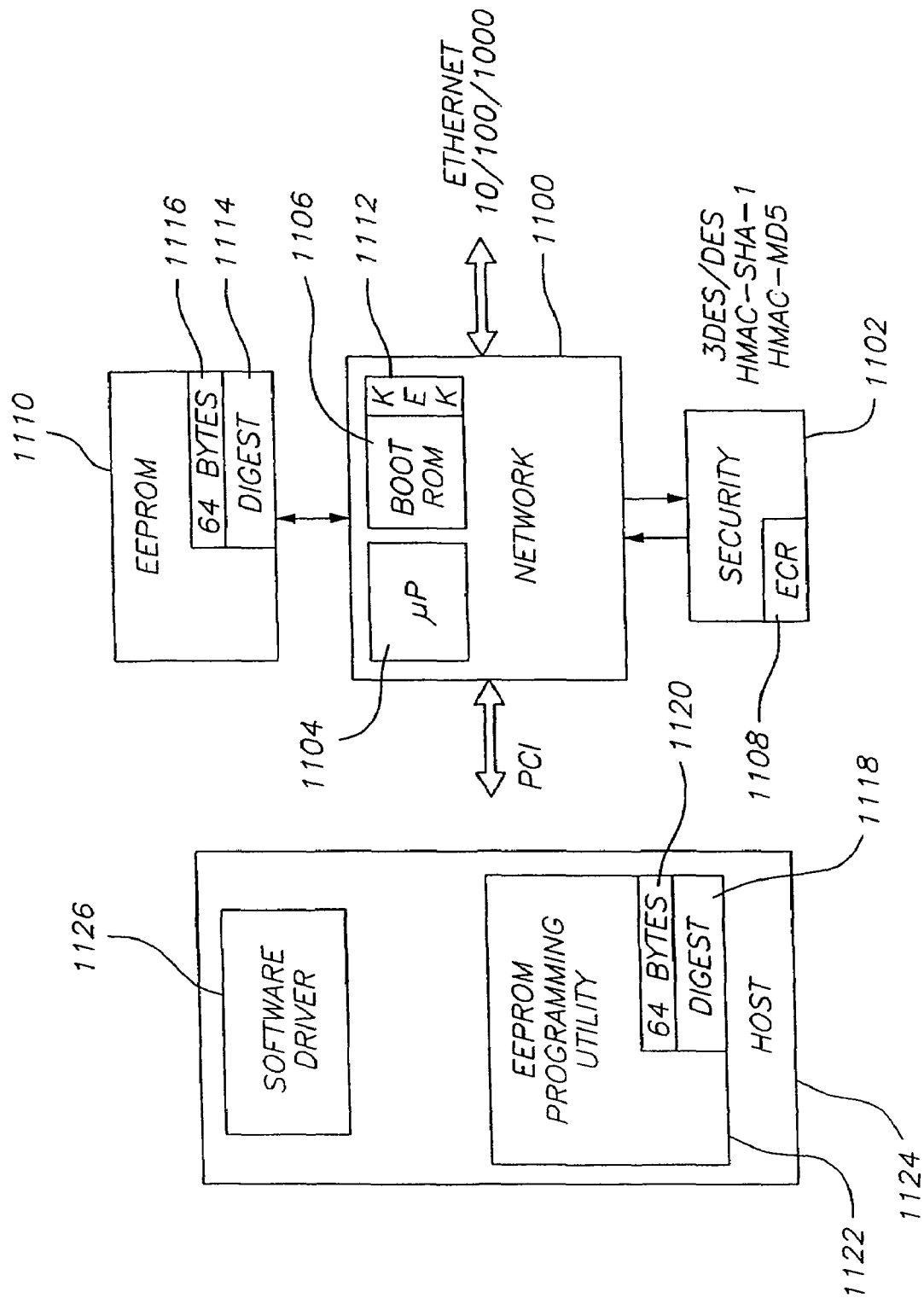
FIG. 11 is a block diagram of another embodiment of a configuration system constructed in accordance with the invention.

Referring now to FIG. 11, another embodiment of a cryptographic system will be discussed. A security subsystem consists of a two-chip set (e.g., two integrated circuits). A network (or controller) chip 1100 performs all of the network interface functions (physical layer, media access controller, on-chip processors, etc.). The second chip 1102 provides the security functions (bulk encryption and hashing). The bulk encryption and hashing functions of the security chip 1102 may include, for example, DES, 3DES, MD5 and SHA-1.

The network chip 1100 contains an embedded processor 1104 that is initialized by executing code from an embedded internal ROM 1106. The network chip 1100 and the security chip 1102 share a hardware reset line that when asserted forces the embedded processor 1104 to execute code (i.e., boot) from the internal ROM 1106. The contents of internal ROM 1106 are mask programmed into the device and cannot be changed after time of manufacture. Thus, the end user can not change the contents of the internal ROM 1106.

The security chip 1102 contains an internal export control register ("ECR") 1108 that controls the enabling of 3DES functionality. The default configuration in the export control register configures the chip so that 3DES is disabled (56 Bit single DES is enabled). Whenever a hardware reset is asserted to the security chip 1102, the default value of the ECR (3DES disabled) is restored. The ECR 1108 can only be written once after hardware reset is asserted. That is, the value in the ECR register 1108 is fixed the first time the ECR 1108 is written after a hardware reset. The value cannot be changed on any subsequent accesses to ECR 1108 until the next hardware reset has completed. Therefore, writing a value equivalent to the default value of "3DES disabled", prevents use of all 3DES functions.

The security subsystem contains an EEPROM 1110 in which vendor specific information, configuration information and executable microprocessor code may be stored. The EEPROM 1110 may be programmed through the network (or controller) device 1100 using a sequence of commands.

Figure 12:
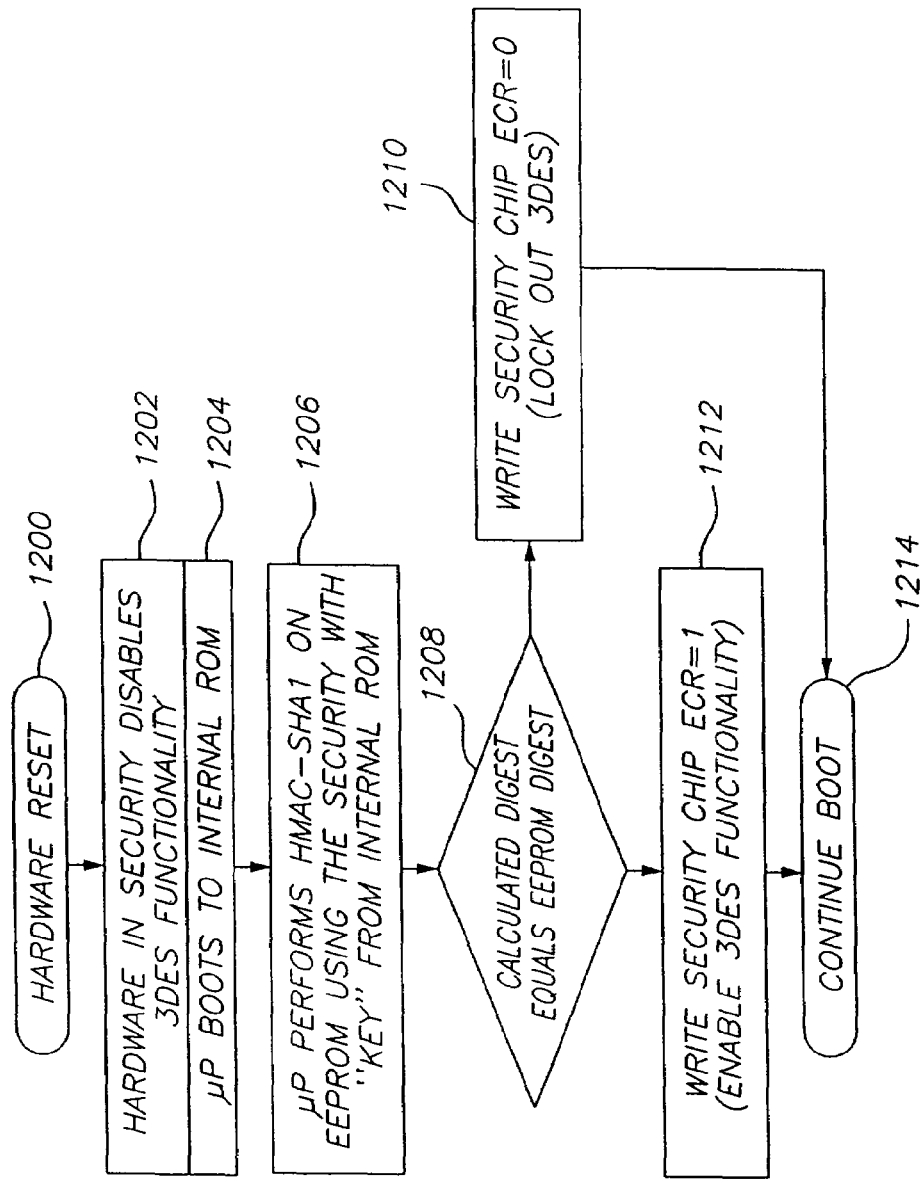
FIG. 12 is a flowchart representative of one embodiment of update operations that may be performed in accordance with the embodiment of FIG. 11.

Example operations of the system of FIG. 11 will be treated in more detail in conjunction with the flowchart of FIG. 12. The default state of the system after a hardware reset has been asserted (block 1200, e.g., power on) disables 3DES functionality on the security chip 1102 (block 1202).

After a hardware reset, the embedded processor 1104 executes the instructions located in the internal ROM 1106 (block 1204).

The embedded processor 1104 in the network chip 1100 manages the decision making required to determined whether or not to enable the 3DES functionality of the subsystem. The internal ROM 1106 contains the instructions that will validate the contents of the EEPROM 1110 using the security chip 1102 to determine whether 3DES should be enabled.

The embedded processor 1104 in the network chip 1100 loads the HMAC key (20 Byte initialization value) 1112 from internal ROM 1106 into the security chip 1102. The EEPROM data to be authenticated and its associated HMAC digest (96 bits) 1114 are fed into the security chip 1102. The security chip 1102 calculates a digest over the EEPROM data (block 1206) and the result is compared to the digest 1114 stored in the EEPROM 1110 (block 1208). The security chip 1102 returns a status word that indicates whether the authentication has passed or failed. The embedded processor 1104 uses the response to determine the value that is written into the ECR 1108 (0=failed=>allow DES ONLY (block 1210); or, 1=passed=>Allow DES & 3DES (block 1212)). Thus, if the EEPROM 1110 does not contain the correct data and digest, the security chip 1102 will not be allowed to use the 3DES functionality. Once the process has completed, the value in the ECR 1108 cannot be changed (until the next hardware reset).

The processor may 1104 skip the validation step if the EEPROM 1110 indicates that data is not present. If the processor 1104 skips the validation step, the ECR 1108 will be written to zero locking out 3 DES functionality.

Typically, the EEPROM 1110 is programmed using a utility 1122 running on host 1124 that is not a part of the standard software drivers 1126. The utility 1122 programs vendor specific data 1120 along with the HMAC-SHAT digest 1118 corresponding to that data into the EEPROM 1110. The digest 1118 may be pre-calculated at the time the EEPROM programming utility is generated based on the vendor specific data 1120. The "key" used to calculate this value is not contained in the utility that is distributed. The EEPROM Programming utility would only be available to the end user as object code.

In another embodiment, the utility could communicate via a network connection to a server that generated a digest that was only valid for this device (i.e. the MAC address is included in the data that is authenticated). The server that distributes the valid digest information (submitted from the programming utility) would control the export enable capability.

One end use provided by the network security interfaces described herein is to support Virtual Private Networks by way of "off loading" Ipsec protocol support (e.g., DES, 3DES, SHA-1 and MD5).

The systems into which the above described security/encryption technology may be installed include, for example, personal computers and servers. These systems may run operating systems such as Windows 2000, Linux or other variants of these operating systems.

Typically the security/encryption technology resides in the computer/server in the form of a chip set and/or network interface card (e.g., 100 Mbps Ethernet card or 1 Gbit Ethernet card). The Ethernet card may be installed into the system as an add-in card (installed either at the time of original manufacture or later added by the end user/corporation) or may reside on the system motherboard when the system is initially manufactured.

Other embodiments of the invention include cryptographic techniques for enabling and/or disabling a variety of functions, features and capabilities of a system. For example, a device constructed according to an embodiment of the invention may cryptographically control the operating speed of a device by, for example, adjusting clock speed in response to configuration information. A device constructed according an embodiment of the invention may cryptographically enable and disable the operation of various processing modules in a device by, for example, sending an appropriate signal to a disable input to the component in response to configuration information. A device constructed according an embodiment of the invention may cryptographically enable and disable application programs by, for example, setting an application disable flag in response to configuration information. A device constructed according to an embodiment of the invention may cryptographically control the processing power of a device by, for example, enabling or disabling one or more parallel computational components in response to configuration information.

It should be appreciated that the inventions described herein are applicable to and may utilize many different protocols and standards and modifications and extensions of those protocols and standards including, for example and without limitation, IPsec, SSL and FCsec. Moreover, a variety of cryptographic and signature algorithms and modifications and extensions thereof may be used including, for example and without limitation, RSA, Diffie-Hellman, elliptic curve and DSA.

It should also be appreciated that the inventions described herein may be constructed using a variety of physical components and configurations. For example, a variety of hardware and software processing components may be used to implement the functions of the security modules, host processors, cryptographic accelerators, network controller and the packet processors. Typically, the network controller and packet processing functions may be implemented in a network processor. These components may be combined on one or more integrated circuits.

In addition, the components and functions described herein may be connected in many different ways. Some of the connections represented by the lead lines in the drawings may be in an integrated circuit, on a circuit board, over a backplane to other circuit boards, over a local network and/or over a wide area network (e.g., the Internet). Thus, some of the components may be located in a remote location with respect to the other components. Typically, one or more of the connections represented by the lead lines in the drawings (e.g., lead lines 542-546 in FIG. 5) may, for example, comprise a data network. In addition, these connections may be made with physical wire, fiber and/or wireless connections, for example.

Some of the connections between components made comprise secure connections (e.g., FIPS-140-2 compliant) while other connections comprise unsecure connections.

A wide variety of devices may be used to implement the data memories (e.g., the databases and non-volatile memories) discussed herein. For example, a data memory may comprise one or more RAM, disk drive, SDRAM, FLASH or other types of data storage devices.

The non-volatile memory may comprise a one-time-programmable circuit for storing, for example, an initial value for KEK, a private key or a shared secret. Examples of one-time-programmable circuits may be found in the following U.S. patent applications which are assigned to the same Assignee as this application: U.S. patent application Ser. No. 10/141,197, filed May 8, 2002 and entitled USING AN ON-CHIP ONE-TIME PROGRAMMABLE NON-VOLATILE MEMORY (OTP NVM) FOR CONFIGURING DEVICE FEATURES; U.S. patent application Ser. No. 10/141,599, filed May 8, 2002 and entitled SYSTEM AND METHOD FOR PROGRAMMING NON-VOLATILE MEMORY. The contents of these applications are hereby incorporated by reference herein.

Non-volatile memory such as a one-time programmable circuit may be employed in any of the components discussed herein including a cryptographic accelerator or a security module. For example, a shared secret could be loaded into the cryptographic accelerator and the security module at the time of their manufacture. This shared secret could then be used to mutually authenticate the cryptographic accelerator and the security module.

The invention may be practiced using different types of cipher engines. For example, in one embodiment of the invention KEK is decrypted using a block cipher, rather than a stream cipher. In one embodiment of the invention, the same hardware may be used to perform the message authentication and decryption operations. Both the CVC MAC and the OFB routines may run an encryption mode of triple DES. Hence, a significant reduction in gate count may be achieved by proving control to the inputs of the triple DES to provide different initial values and keys to the triple DES depending on which operation is being performed.

In one embodiment of the invention, the key manager provides access to unsecured portions of the EEPROM to other components in the system. Thus, the system may be configured with only a single EEPROM.

In another embodiment of the invention, the EEPROM may be shared among multiple key managers. This provides the advantage whereby the key managers can share the same configuration information. Thus, the system may be configured so that any one of several cryptographic accelerators may process a given incoming packet.

In summary, the invention described herein teaches improved techniques for using cryptographic techniques to configure data processing systems. While certain exemplary embodiments have been described in detail and shown in the accompanying drawings, it is to be understood that such embodiments are merely illustrative of and not restrictive of the broad invention. In particular, is should be recognized that the teachings of the invention apply to a wide variety of systems and processes that are configurable. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A device having configurable security, comprising:
   a data memory configured to store configuration information;
   a cipher engine configured to encrypt data using either a first encryption technique or a second encryption technique, stronger than the first encryption technique, based on the configuration information stored in the data memory, wherein the configuration information initially instructs the cipher engine to encrypt data using the first encryption technique; and
   a configuration manager configured:
   (i) to receive a new configuration information via a network connection, the new configuration information indicating whether a server has determined that the cipher engine is authorized by an export compliance authority to use a second encryption technique stronger than the first encryption technique,
   (ii) to authenticate the new configuration information, and,
   (iii) if the new configuration information is determined to be authentic and indicates that the server has determined that the cipher engine is authorized by the export compliance authority to use the second encryption technique, to store the new configuration information in the data memory to configure the cipher engine to encrypt data using the second encryption technique.

2. The device of claim 1, wherein the first encryption technique is a weak encryption technique.

3. The device of 1, wherein the configuration manager is configured to adjust a clock speed in response to the new configuration information.

4. The device of claim 3, wherein the configuration manager is configured to enable or disable one or more parallel computational components in response to the new configuration information.

5. The device of claim 1, wherein the configuration manager is configured to enable or disable one or more parallel computational components in response to the new configuration information.

6. The device of claim 1, wherein the configuration manager is configured to decrypt the new configuration information.

7. The device of claim 1, wherein the second encryption technique uses a key having greater than 64 bits and the first encryption technique uses a key having 64 bits or less.

8. The device of claim 1, wherein the configuration manager is configured to only store the new configuration information in the data memory to configure the cipher engine when modification of the configuration information is enabled.

9. A system for configuring security of a host device initially configured to use a first encryption technique, comprising:
   a registration application configured to enable a user to register the host device with an export compliance authority, determines that the host device is authorized to use a second encryption technique that is stronger than the first encryption technique, and, upon receiving approval of the export compliance authority, to send data to the host device via one or more networks, the data indicating that the registration application has determined that the host device is authorized to use the second encryption technique,
   wherein the data instructs the host device to use the second encryption technique.

10. The system of claim 9, wherein the data sent to the host device is able to instruct the host device to adjust a clock speed of the host.

11. The system of claim 10, wherein the data sent to the host device is able to instruct the host device to enable or disable one or more parallel computational components of the host device.

12. The system of claim 9, wherein the data sent to the host device is able to instruct the host device to enable or disable further modification of the host device's security configuration.

13. The system of claim 9, wherein the export compliance authority is a Department of Commerce application.

14. The system of claim 9, wherein the data sent to the host device comprises configuration information and information to authenticate the configuration information to the host device, wherein the configuration information instructs the host device to update a security configuration of the host device.

15. The system of claim 9, wherein the data sent to the host device comprises an upgrade utility, wherein the host device is configured to execute the upgrade utility to update a security configuration of the host device.

16. A method for configuring security of a host device initially configured to use a first encryption technique, comprising:
   (a) enabling a user to register the host device with an export compliance authority;

(b) receiving an approval of the export compliance authority that the host device is authorized to use a second encryption technique stronger than the first encryption technique; and (c) upon receiving the approval of the export compliance authority, sending data to the host device via one or more networks, the data indicating that the host device is authorized to use the second encryption technique, wherein the data instructs the host device to use the second encryption technique.

17. The method of claim 16, wherein the data instructs the host device to adjust a clock speed.

18. The method of claim 17, wherein the data instructs the host device to enable or disable one or more parallel computational components.

19. The method of claim 16, wherein the data instructs the host device to disable further modification of the host device's security configuration.

20. The method of claim 16, wherein said step (b) comprises receiving the approval of a Department of Commerce application.

21. A mobile device having configurable security, comprising:
   a data memory configured to store configuration information;
   a cipher engine configured to enable or disable a security feature of the mobile device based on the configuration information stored in the data memory, wherein the configuration information initially instructs the cipher engine to disable the security feature; and
   a configuration manager configured:
      (i) to receive a new configuration information via a network connection, the new configuration information indicating whether a server has determined that the cipher engine is authorized to use the security feature,
      (ii) to authenticate the new configuration information, and,
      (iii) if the new configuration information is determined to be authentic and indicates that the server has determined that the cipher engine is authorized to use the security feature, to store the new configuration information in the data memory to enable the security feature of the mobile device.

22. The device of claim 1, wherein the first encryption technique uses a longer key than the second encryption technique.

23. The system of claim 9, wherein the first encryption technique uses a longer key than the second encryption technique.

24. The method of claim 16, wherein first encryption technique uses a longer key than the second encryption technique.

25. A device having configurable security, comprising:
   a data memory configured to store configuration information;
   a cipher engine configured to encrypt data using either a first encryption or a second encryption based on the configuration information stored in the data memory; and
   a configuration manager configured to receive a new configuration information via a network connection, to authenticate the new configuration information, and, if the new configuration information is authentic, to store the new configuration information in the data memory to configure the cipher engine to encrypt data using either the first encryption or the second encryption,
   wherein the configuration manager is configured to adjust a clock speed in response to the new configuration information.

26. The device of claim 25, wherein the configuration manager is configured to enable or disable one or more parallel computational components in response to the new configuration information.

27. A system for configuring security of a host device, comprising:
   a registration application configured to enable a user to register the host device with an export compliance authority and, upon receiving approval of the export compliance authority, to send data to the host device via one or more networks,
   wherein the data instructs the host device whether to use either a first encryption or a second encryption, wherein the data sent to the host device is able to instruct the host device to adjust a clock speed of the host.

28. A method for configuring security of a host device, comprising:
   (a) enabling a user to register the host device with an export compliance authority;
   (b) receiving an approval of the export compliance authority; and
   (c) sending data to the host device via one or more networks upon receiving the approval of the export compliance authority,
   wherein the data instructs the host device whether to use either a first encryption or a second encryption, wherein the data instructs the host device to adjust a clock speed.

* * * * *